(12) United States Patent
Nachlieli et al.

(10) Patent No.: US 8,594,448 B2
(45) Date of Patent: Nov. 26, 2013

(54) BI-SELECTIVE FILTERING IN TRANSFORM DOMAIN

(75) Inventors: Hila Nachlieli, Haifa (IL); Carl Staelin, Haifa (IL); Mani Fischer, Haifa (IL); Doron Shaked, Haifa (IL); Pavel Kisilev, Ma'a lot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 3100 days.

(21) Appl. No.: 10/919,671

(22) Filed: Aug. 16, 2004

(65) Prior Publication Data
US 2006/0034539 A1    Feb. 16, 2006

(51) Int. Cl.
*G06K 9/40*    (2006.01)

(52) U.S. Cl.
USPC ............................ 382/260; 382/263; 382/264

(58) Field of Classification Search
USPC .................. 382/263, 264, 266, 268
See application file for complete search history.

(56) References Cited

U.S. PATENT DOCUMENTS

| | | | | |
|---|---|---|---|---|
| 5,392,137 A * | 2/1995 | Okubo | ........................... | 358/462 |
| 5,682,443 A * | 10/1997 | Gouch et al. | ................... | 382/254 |
| 6,023,535 A * | 2/2000 | Aoki | ............................. | 382/299 |
| 6,055,340 A * | 4/2000 | Nagao | ............................ | 382/261 |
| 6,421,468 B1 * | 7/2002 | Ratnakar et al. | .............. | 382/254 |
| 6,473,534 B1 | 10/2002 | Merhav et al. | | |
| 6,665,448 B1 * | 12/2003 | Maurer | ........................ | 382/261 |
| 6,731,821 B1 | 5/2004 | Maurer et al. | | |
| 7,068,851 B1 * | 6/2006 | Berkner | ......................... | 382/261 |
| 7,076,111 B2 * | 7/2006 | Shinbata | ....................... | 382/254 |
| 7,079,700 B2 * | 7/2006 | Shinbata | ....................... | 382/254 |
| 7,206,459 B2 * | 4/2007 | Berkner et al. | ............... | 382/251 |
| 7,239,424 B1 * | 7/2007 | Berkner et al. | ............... | 358/2.1 |
| 2002/0034337 A1 * | 3/2002 | Shekter | ........................ | 382/275 |
| 2002/0106027 A1 | 8/2002 | Moon-Ho et al. | | |
| 2003/0016855 A1 * | 1/2003 | Shinbata | ....................... | 382/132 |
| 2003/0086623 A1 * | 5/2003 | Berkner et al. | ............... | 382/260 |
| 2004/0240545 A1 * | 12/2004 | Guleryuz | ................... | 375/240.2 |
| 2005/0078872 A1 * | 4/2005 | Samadani et al. | ............ | 382/233 |
| 2005/0123210 A1 * | 6/2005 | Bhattacharjya | ............... | 382/254 |
| 2006/0034539 A1 * | 2/2006 | Nachlieli et al. | .............. | 382/260 |
| 2006/0210186 A1 * | 9/2006 | Berkner | ........................ | 382/248 |

FOREIGN PATENT DOCUMENTS

EP     1282075     2/2003

OTHER PUBLICATIONS

R.R. Coifma q. D.L.Donoho, Translation-Invariant De-Noising, http:/IWww-Stat.Stanford.Edu/-Donoho/Reports/1995ITidenoise. Pdf (1995).

A. Nosratinia, Enhancement of JPEG-Compressed Images by Re-application of JPEG. J. of VLSI signal proc. vol. 27 pp. 69-79, 2001.

EP.Simoncel i, E.H.Adelson, Noise removal via Bayesian wavelet coring, Proc 3rd IEEE Intl Conf Image Processing, vol. I pp. 379-382,1996.

(Continued)

*Primary Examiner* — Sean Motsinger

(57) ABSTRACT

Methods, machines, and computer-readable media for processing an input image with a bi-selective filter in a transform domain are described. In one aspect, a forward transform of an input image is computed. A bi-selective filter smoothes image regions with low magnitude coefficients and sharpens image regions with high magnitude coefficients. An output image is generated from the filtered forward transform.

16 Claims, 3 Drawing Sheets

(56) References Cited

OTHER PUBLICATIONS

E.P Simoncelli, Bayesian Denoising of Visual Images in the Wavelet Domain, Http:NWww.Cns.Nyu.Edu/Pub/Eero/Simoncelli98e.Pdf, Published As: Bayesian Inference In Wavelet Based Models, Eds. P Muller and Vidakivic. ChapterI8. pp. 291-308, Lecture Notes in Statistics, vol. 141, Springer-Verlag, New York, 1999.

E. P. Simoncelli, R. W. Vuccigrossi, Embedded wavelet image compression based on joint probability model. 4th IEEE international conference on Image processing, 1997.

K.Berkner, M.J.Gormish, E. L. Schwartz, Multiscale sharpening and smoothing in Besov Spaces with applications to images enhancement. Applied and computation harmonic analysis, 11, 2-31(2001).

CR Jung, J Scharcanski, Adaptive image denoising and edge enhancement in scale-space using the wavelet transform. Pattern Recogn Lett 24 (7): 9635-971 Apr. 2003.

Onur G. Guleryuz, "Weighted Overcomplete Denoising," Proc. Asilomar Conference on Signals and Systems, Pacific Grove, CA, Nov. 2003.

D. Donoho. Denoising by soft-thresholding. IEEE Trans. Info. Theory, 43:613-627, 1995.

\* cited by examiner

BI-SELECTIVE FILTERING IN TRANSFORM DOMAIN

BACKGROUND

Common image filtering techniques include image smoothing and image sharpening. Smoothing is a technique for reducing certain types of noise in an image. Sharpening is a technique for sharpening the edges within an image to improve the perceptual visual quality of the image. Non-selective filters treat all features in an image in the same way. Thus, flat regions of an image are treated in the same fashion as edge regions. Non-selective filters tend to either smooth edge regions or amplify noise. On the other hand, selective filters (e.g., selective smoothing and/or selective sharpening filters) overcome the disadvantages of non-selective filters by applying the filtering function only to selected types features while preserving non-selected types features.

Some selective denoising techniques selectively smooth flat regions of an image, while leaving edge regions untouched. Similarly, some selective sharpening methods selectively sharpen edge regions without sharpening flat regions. Some other denoising techniques, however, combine selective image sharpening and selective image smoothing in a single filter. For example, in one approach, a pre-existing selective smoothing filter is used to derive a matching non-selective smoothing filter by disabling the selectivity mechanism of the selective smoothing filter. The difference of the pre-existing and derived filters is substituted into the high-pass filter operation of an unsharp masking filter operation to form the image processing filter.

One example of an edge preserving, selective smoothing filter is an anisotropic diffusion filter. Another example of a selective filter is a bilateral filter. One exemplary non-iterative, locally adaptive bi-selective filter for removing noise from images corresponds to a weighted average of the local neighborhood pixels, where the weights are computed as a function of both distances and gray-level differences between a center pixel and pixels neighboring the center pixel. Another type of selective filter is a robust filter that includes an influence function that is designed to reduce the influence of outliers (i.e., neighboring pixels with intensities that are very different from the intensity of the pixel being filtered).

SUMMARY

The invention features methods, machines, and computer-readable media for processing an input image with a bi-selective filter in a transform domain.

In one aspect of the invention, a forward transform of an input image is computed. A bi-selective filter smoothes image regions with low magnitude coefficients and sharpens image regions with high magnitude coefficients. An output image is generated from the filtered forward transform.

The invention also features a machine and a computer-readable medium for implementing the above-described image processing method.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Overview

The image processing embodiments described in detail below bi-selectively filter image data in a transform domain to simultaneously smooth and sharpen the image data. A bi-selective filter distinguishes between smooth regions, where the forward transform coefficients have low magnitude, and feature regions, where the forward transform coefficients have high magnitude. Thus, these embodiments are able to denoise images and simultaneously compensate for any image blurring caused by the denoising process in a single processing step. In this way, these embodiments are able to avoid the additional processing steps that otherwise would be needed if a dedicated, single-function image denoising filter were used.

In addition, some of the embodiments described below may reduce artifacts inherently introduced by processes that are used to create compressed images. In many instances, these embodiments reduce image compression artifacts without degrading image quality, such as by blurring features in the image. As described in detail below, some implementations of these embodiments are particularly well-suited to substantially reduce blocking compression artifacts that are introduced by block-transform-based image compression techniques, such as block discrete cosine transform (DCT) image compression techniques.

II. Bi-Selective Filtering in Transform Domain

Figure 1:
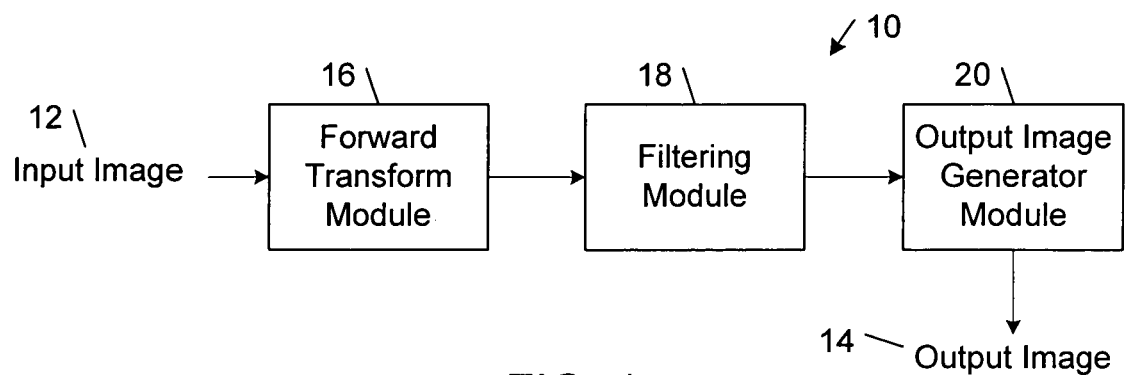
FIG. 1 is a block diagram of an embodiment of an image processing system.

FIG. 1 shows an embodiment of an image processing system 10 for processing an input image 12 into a denoised and sharpened output image 14. The image processing system 10 includes a forward transform module 16, a filtering module 18, and an output image generator module 20. In general, the modules 16-20 of system 10 are not limited to any particular hardware or software configuration, but rather they may be implemented in any computing or processing environment, including in digital electronic circuitry or in computer hardware, firmware, device driver, or software. For example, in some implementations, these modules 16-20 may be embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants). In addition, although full (or complete) input images are processed in the illustrated embodiments, other embodiments may be configured to sequentially process a series of sub-image portions (e.g., swaths) of an input image.

Figure 2:
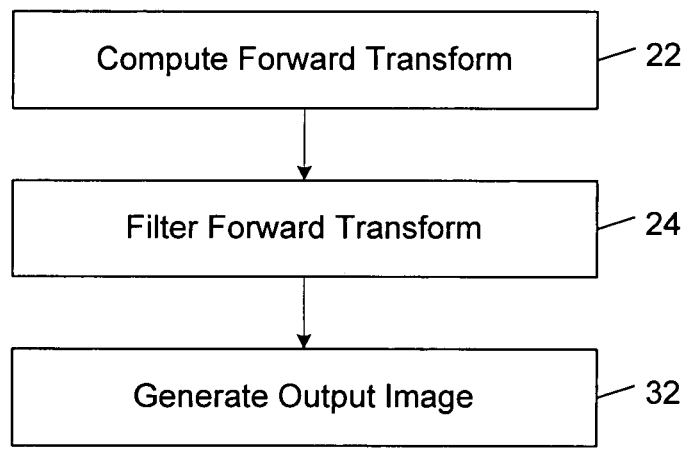
FIG. 2 is a flow diagram of an embodiment of a method of processing an input image.

FIG. 2 shows an embodiment of a method in accordance with which image processing system 10 processes input image 12 to produce the denoised and sharpened output image 14.

The forward transform module 16 computes a forward transform of the input image 12 (block 22). The forward transform may be any type of transform that can convert the input image 12 into a set of coefficients in a selected domain. Exemplary types of forward transforms include the cosine transform, Fourier transform, Hadamard transform, and wavelet transform. In some implementations, the input image 12 is divided into small rectangular regions (or "blocks"), which are subjected to a selected forward transform.

The filtering module 18 applies a bi-selective filter to the forward transform computed by the forward transform module 16 (block 24). The bi-selective filter is applied individually to the forward transform coefficients computed by the forward transform module 16. The bi-selective filter operates to discard some of forward transform coefficient information. In particular, the bi-selective filter is configured to smooth low magnitude coefficients of the forward transform and to sharpen high magnitude coefficients of the forward transform. This allows the image processing system 10 to denoise the input image 12 and simultaneously compensate for any image blurring caused the denoising process in a single processing step. In this way, the image processing system 10 is able to avoid the additional processing steps that otherwise would be needed if a dedicated, single-function image denoising filter were used.

Figure 3:
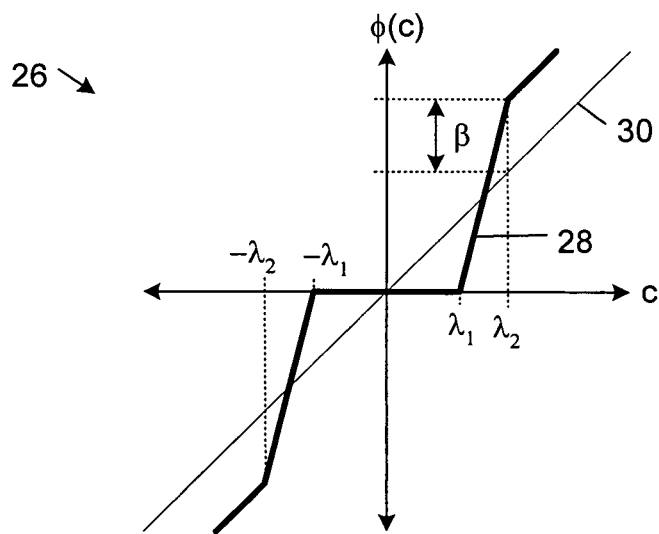
FIG. 3 is a graph of an embodiment of a bi-selective filter for transform domain bi-selective filtering.

FIG. 3 shows a graph of an implementation of an exemplary bi-selective filter 26. In this implementation, the bi-selective filter 26 is configured to set to zero the magnitudes of forward transform coefficients (c) that are below a first threshold $\lambda_1$. The bi-selective filter 26 also is configured to add a sharpening constant ($\beta$) to the magnitudes of forward transform coefficients that are above a second threshold $\lambda_2$. The bi-selective filter 26 modifies forward transform coefficient magnitudes between the first and second thresholds $\lambda_1$, $\lambda_2$ in accordance with a mapping function 28 that increases monotonically with increasing forward transform coefficient magnitude. In the illustrated implementation, the mapping function 28 increases linearly from zero to the sum of the values of the second threshold $\lambda_2$ and the sharpening constant $\beta$. The bi-selective filter 26 shown in FIG. 3 is summarized mathematically as follows:

$$\phi(c)=0, \text{ for } 0 \leq c \leq \lambda_1 \quad (1)$$

$$\phi(c)=\alpha \cdot (c-\lambda_1), \text{ for } \lambda_1 \leq c \leq \lambda_2 \quad (2)$$

$$\phi(c)=c+\beta, \text{ for } c \geq \lambda_2 \quad (3)$$

where $\alpha$ is the slope of the linear mapping function 28 and $\alpha>1$. For coefficient magnitudes greater than the second threshold $\lambda_2$, the filtering function corresponds to a line that is parallel to the identity line 30 ($\phi(c)=c$), but separated from the identity line 30 by the sharpening constant $\beta$. In operation, equations (1), (2), and (3) are applied on the absolute value of an input coefficient, c, and the sign of the input coefficient is assigned to the function result, $\phi(c)$, to produce the output coefficient.

The bi-selective filter parameters $\alpha$, $\lambda_1$, $\lambda_2$, and $\beta$ may be constant for the entire input image 12 or they may vary, for example, based on the local features of the portion of the input image currently being filtered, on the content of a region in the image, or on the transform component corresponding to the coefficient at hand. In some implementations, the bi-selective filter parameters are set based on local texture measurements. For example, the degree of smoothing may be reduced in high texture regions by reducing the first threshold $\lambda_1$ in these regions. In some implementations, the bi-selective filter parameters are set based on image content analysis (e.g., a face detection analysis) of an image region being filtered. For example, the degree of smoothing may be increased and the degree of sharpening may be decreased in regions corresponding to detected faces by increasing the first threshold $\lambda_1$ and decreasing the second threshold $\lambda_2$ in these regions. In one exemplary implementation, the bi-selective filter parameters are set to $\alpha=1$, $\lambda_1=0$ and $\lambda_2=$infinity, in which case the bi-selective filter corresponds to the identity line 30. This exemplary bi-selective filter may be applied to all DC transform coefficients computed for a given image while another bi-selective filter, which is based on different parameters, may be applied to the non-DC transform coefficients computed for the given image.

Referring back to FIG. 2, the output image generator module 20 generates the output image 14 from the filtered forward transform (block 32). The output image generator 20 computes an inverse transform from the set of filtered forward transform coefficients produced by the filtering module 18. The inverse transform corresponds to the inverse of the forward transform operation that is applied by forward transform module 16 to the input image 12 to generate the forward transform coefficients.

In some implementations, if the input image 12 is not already represented in a preselected color space (e.g., the YCrCb color space), the input image 12 initially is converted into the preselected luminance-based color space before being processed by the forward transform module 16. Each color plane of the input image in the preselected color space corresponds to a respective image (i.e., an array of pixel values) that is processed individually by each of the modules 16-20 of system 10. The color components (e.g., the Cr and Cb color components) of the input image 12 may be downsampled before they are processed. The output image generator module 20 may upsample each color component to the original resolution and convert the resulting image planes back to the original color space (e.g., the Red-Green-Blue color space) of the input image 12.

III. Shift-Averaging Bi-Selective Filtering in Transform Domain

Figure 4:
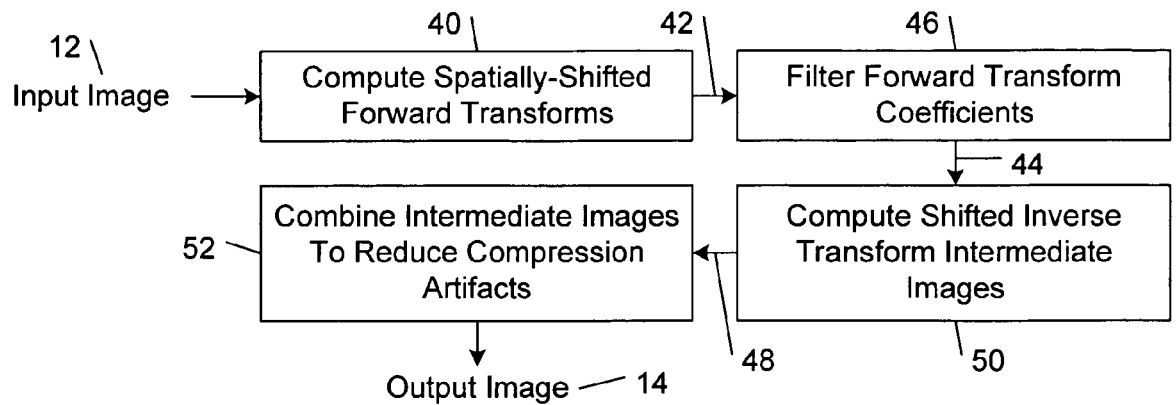
FIG. 4 is a flow diagram of an implementation of the image processing method of FIG. 2.

FIG. 4 shows an embodiment of a method of processing an input image 12 that is generated by a block-transform-based image compression method to produce an output image 14 with reduced compression artifacts. In this method, each plane of the input image 12 is processed individually. If originally encoded (e.g., in accordance with a lossless encoding process), the input image 12 is decoded before being processed as follows.

Spatially-shifted forward transforms are computed from the input image data (block 40). In this process, a forward transform operation is applied to each of multiple shifted versions of the input image data to produce multiple respective sets of forward transform coefficients 42. For example, in an implementation in which the input image 12 was originally compressed based on blocks of M×N pixels, the forward transform operation is applied to a subset of the input image data containing K shifts from the M×N independent shifts possible in an M×N transform to produce K sets of forward transform coefficients, where K, M, and N have integer values of at least 1. In one exemplary implementation, both M and N have a value of 8.

The forward transform coefficients 42 of each set are bi-selectively filtered as described above in connected with FIGS. 2 and 3 to produce respective sets of filtered forward transform coefficients 44 (block 46).

An inverse transform operation is applied to each of the sets of filtered forward transform coefficients 46 to produce respective shifted inverse transform intermediate images 48 (block 50). In particular, the inverse of the forward transform operation that is applied during the forward transform process 40 is computed from the sets of filtered forward transform coefficients 46 to generate the shifted intermediate images 48.

As explained in detail below, the intermediate images 48 are combined to reduce compression artifacts in each color plane of the input image 12 (block 52). In some implementations, the resulting color component image planes (e.g., Cr and Cb) are upsampled to the original resolution and then converted back to the original color space (e.g., the Red-Green-Blue color space) of the input image 12. The image planes then are combined to produce the output image 14.

Figure 5:
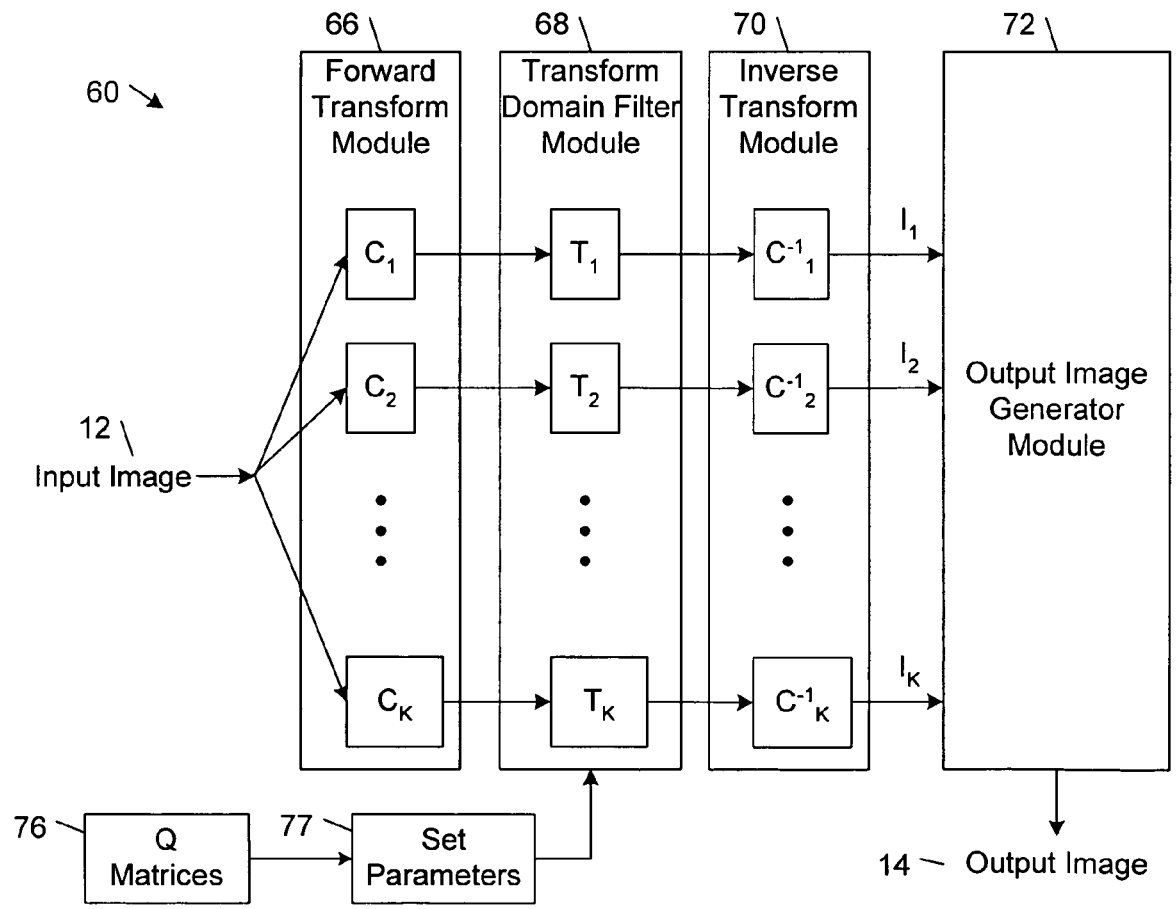
FIG. 5 is a block diagram of an implementation of the image processing system of FIG. 1 that includes an output image generator module.

FIG. 5 shows an embodiment of a system 60 for processing the (optionally decoded) input image data to produce the compression-artifact-reduced output image 14. Processing system 60 includes a forward transform module 66, a transform domain filter module 68, an inverse transform module 70, and an output image generator module 72. In general, the modules 66-72 of system 60 are not limited to any particular hardware or software configuration, but rather they may be implemented in any computing or processing environment, including in digital electronic circuitry or in computer hardware, firmware, device driver, or software. For example, in some implementations, these modules 66-72 may be embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants). In addition, although full (or complete) input images are processed in the illustrated embodiments, other embodiments may be configured to sequentially process a series of sub-image portions (e.g., swaths) of an input image.

A. Forward Transform Module

The forward transform module 66 computes from the image data K sets ($C_1, C_2, \ldots, C_K$) of shifted forward transforms, corresponding to K unique positions of a blocking grid relative to the input image 12. In one example, each block of the forward transform is computed based on a frequency-domain transform D. Each block of the spatially-shifted forward transforms $C_l$ ($l=1, 2, \ldots, K$) may be computed based on the separable application of the transform D in two dimensions as follows:

$$B = DXD^T \quad (4)$$

where X corresponds to a block of the decompressed image data 62, $D^T$ corresponds to the transpose of transform D, and B corresponds to the transform coefficients of the image block X.

In some implementations, D is a block-based linear transform, such as a discrete cosine transform (DCT). In one dimension, the DCT transform is given to four decimal places by the following 8 by 8 matrix:

$$D = \begin{bmatrix} 0.3536 & 0.3536 & 0.3536 & 0.3536 & 0.3536 & 0.3536 & 0.3536 & 0.3536 \\ 0.4904 & 0.4157 & 0.2778 & 0.0975 & -0.0975 & -0.2778 & -0.4157 & -0.4904 \\ 0.4619 & 0.1913 & -0.1913 & -0.4619 & -0.4619 & -0.1913 & 0.1913 & 0.4619 \\ 0.4157 & -0.0975 & -0.4904 & -0.2778 & 0.2778 & 0.4904 & 0.0975 & -0.4157 \\ 0.3536 & -0.3536 & -0.3536 & 0.3536 & 0.3536 & -0.3536 & -0.3536 & 0.3536 \\ 0.2778 & -0.4904 & 0.0975 & 0.4157 & -0.4157 & -0.0975 & 0.4904 & -0.2778 \\ 0.1913 & -0.4619 & 0.4619 & -0.1913 & -0.1913 & 0.4619 & -0.4619 & 0.1913 \\ 0.0975 & -0.2778 & 0.4157 & -0.4904 & 0.4904 & -0.4157 & 0.2778 & -0.0975 \end{bmatrix} \quad (5)$$

In some implementations, the blocks of the spatially-shifted forward transforms ($C_1, C_2, \ldots, C_K$) are computed based on a factorization of the transform D, as described in U.S. Pat. No. 6,473,534, for example.

In some other implementations, D is a wavelet-based decomposition transform. In one of these implementations, for example, D may be a forward discrete wavelet transform (DWT) that decomposes a one-dimensional (1-D) sequence (e.g., line of an image) into two sequences (called sub-bands), each with half the number of samples. In this implementation, the 1-D sequence may be decomposed according to the following procedure: the 1-D sequence is separately low-pass and high-pass filtered by an analysis filter bank; and the filtered signals are downsampled by a factor of two to form the low-pass and high-pass sub-bands.

B. Transform Domain Filter Module

The transform domain filter module 68 bi-selectively filters the sets of forward transform coefficients 42 corresponding to the shifted forward transforms ($C_1, C_2, \ldots, C_K$) that are computed by the forward transform module 66.

In some implementations, the sets of forward transform coefficients are bi-selectively filtered in accordance with respective filtering transformations ($T_1, T_2, \ldots, T_K$). In some implementations, the parameters of the bi-selective filtering transforms are the same for the entire input image 12. In other implementations, the parameters of the bi-selective filtering transforms may vary. In one exemplary formulation, the forward transform coefficients are filtered by a respective bi-selective filter corresponding to the bi-selective filter 76 shown in FIG. 3 with threshold parameters $\lambda_{1,ij}, \lambda_{2,ij}$, where i, j refer to the indices of the transform component, with i having values in the range of 0 to M−1 and j having values in the range of 0 to N−1. In some implementations, the threshold parameters $\lambda_{1,ij}, \lambda_{2,ij}$ are the same for each transform component. In some implementations, the threshold parameters vary according to transform component. In most implementations the DC coefficients are not filtered. That is, a bi-selective filter with the parameters $\alpha=1, \lambda_1=0, \lambda_2=\infty$ is applied to the DC coefficients, while other parameters determine the bi-selective filters that are applied to other, non-DC transform coefficients. In some implementations, the threshold parameters vary according to image region (e.g., face region or textured region). In other implementations, quantization matrices 76 (or "Q Matrices") may be used to set the threshold parameters $\lambda_{1,ij}$, $\lambda_{2,ij}$ for the bi-selective filtering transformations ($T_1$, $T_2$, ..., $T_K$). In some implementations, the quantization matrices contain the same quantization parameters $q_{ij}$ that were originally used to compress input image 12. These quantization parameters may be stored in the compressed input image file in accordance with an image compression scheme (e.g., JPEG).

In some implementations, the threshold parameters $\lambda_{1,ij}$, $\lambda_{2,ij}$ are set in block 77 by a function M that maps the quantization parameters $q_{ij}$ of the Q matrices to the corresponding threshold parameters $\lambda_{1,ij}$, $\lambda_{2,ij}$.

C. Inverse Transform Module

The inverse transform module 70 computes sets of inverse transforms ($C^{-1}_1$, $C^{-1}_2$, ..., $C^{-1}_K$) from the sets of bi-selectively filtered forward transform coefficients 44. The inverse transform module 70 applies the inverse of the forward transform operation that is applied by forward transform module 66. The outputs of the inverse transform module 70 are intermediate images ($I_1, I_2, \ldots, I_K$) representing the image data in the spatial domain. The terms inverse transforms ($C^{-1}_1$, $C^{-1}_2$, ..., $C^{-1}_K$) and intermediate images ($I_1, I_2, \ldots, I_K$) are used synonymously herein. The blocks of the spatially-shifted inverse transforms ($C^{-1}_1$, $C^{-1}_2$, ..., $C^{-1}_K$) may be computed from equation (6):

$$C^- = D^{-1} F (D^T)^{-1} \quad (6)$$

where F corresponds to output of the transform domain filter module 68, D is the forward transform, $D^{-1}$ is the inverse transform, and DT is the transpose of the transform D.

D. Output Image Generator Module

The output image generator module 72 combines the intermediate images ($I_1, I_2, \ldots, I_K$) to form the image planes of the output image 14. In general, the output image generator module 72 computes the output image 14 based on a combination of some or all of the intermediate images ($I_1, I_2, \ldots, I_K$). For example, in some implementations, the output image 40 is computed from a weighted combination of the intermediate images ($I_1, I_2, \ldots, I_K$). In general, the weights may be constant for a given output image 14 being constructed or they may vary for different regions of the given output image 14. For example, in one of these implementations, the output image 40 corresponds to an weighted average of the intermediate images ($I_1, I_2, \ldots, I_K$). In other implementations, the weights may be a function of the transform coefficients on measures of image region content (e.g., texture or detected faces). In some of these implementations, the weights of the intermediate images ($I_j$) that correspond to blocks with too many coefficients above a given threshold (which indicates edge or texture in the original image) are set to zero, and only the intermediate images that are obtained from blocks with more coefficients below the threshold are used to compute the output image 14. In other of these implementations, the output image 40 corresponds to the median of the intermediate images ($I_1, I_2, \ldots, I_K$).

Figure 6:
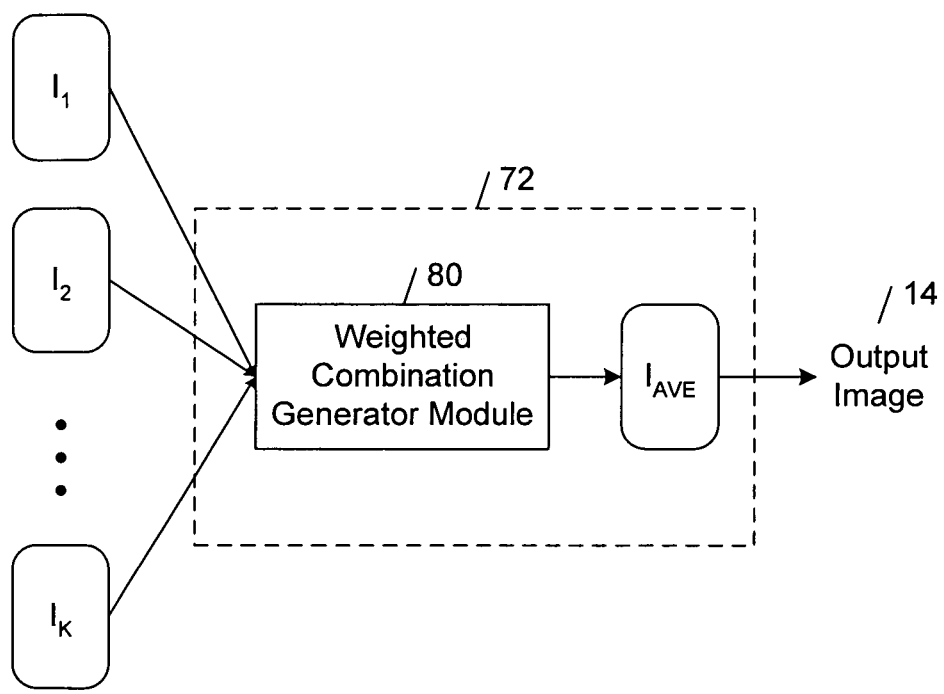
FIG. 6 is a block diagram of the output image generator module shown in FIG. 5 that includes a function generator module configured to combine a set of intermediate images to generate an output image with reduced compression artifacts.

FIG. 6 shows an embodiment of the output image generator module 72 that includes a weighted combination generator module 80 that computes a base image ($I_{AVE}$) from a combination of the intermediate images ($I_1, I_2, \ldots, I_K$). The base image corresponds to an estimate of the original uncompressed version of the input image 12. In the illustrated embodiment, weighted combination generator module 80 computes a base image ($I_{AVE}$) that has pixel values corresponding to averages of corresponding pixels in the intermediate images ($I_1, I_2, \ldots, I_K$).

IV. Conclusion

The systems and methods described herein are not limited to any particular hardware or software configuration, but rather they may be implemented in any computing or processing environment, including in digital electronic circuitry or in computer hardware, firmware, or software. In general, the systems may be implemented, in part, in a computer process product tangibly embodied in a machine-readable storage device for execution by a computer processor. In some embodiments, these systems preferably are implemented in a high level procedural or object oriented processing language; however, the algorithms may be implemented in assembly or machine language, if desired. In any case, the processing language may be a compiled or interpreted language. The methods described herein may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

What is claimed is:

1. A machine-implemented method of processing an input image, comprising:
   computing a forward transform of the input image;
   applying to the forward transform a bi-selective filter configured to smooth image regions with low magnitude coefficients of the forward transform below a first threshold and to sharpen image regions with high magnitude coefficients of the forward transform above a second threshold, wherein the bi-selective filter is configured to set forward transform coefficient magnitudes below the first threshold to zero, increase forward transform coefficient magnitudes at the second threshold to a first value, increase forward transform coefficient magnitudes above the second threshold to respective values, and to modify forward transform coefficient magnitudes between the first and second thresholds in accordance with a mapping function that increases monotonically with increasing forward transform coefficient magnitude from zero at the first threshold to the first value; and
   generating an output image from the filtered forward transform.

2. The method of claim 1, wherein the bi-selective filter is configured to add a sharpening constant to forward transform coefficient magnitudes above the second threshold.

3. The method of claim 2, wherein the mapping function increases linearly from zero at the first threshold to the sum of the values of the second threshold and the sharpening constant at the second threshold.

4. The method of claim 1, wherein the first and second threshold are computed based on transform component or on measures of image content.

5. The method of claim 1, wherein generating the output image comprises computing an inverse transform from the filtered forward transform.

6. A machine for processing an input image, comprising:
   a memory storing processor-readable instructions; and
   a processor coupled to the memory, operable to execute the instructions, and based at least in part on the execution of the instructions operable to perform operations comprising:
   computing a forward transform of the input image,
   applying to the forward transform a bi-selective filter configured to smooth image regions with low magnitude coefficients of the forward transform below a first threshold and to sharpen image regions with high magnitude coefficients of the forward transform above a second threshold, wherein the bi-selective filter is configured to set forward transform coefficient magnitudes below the first threshold to zero, increase forward transform coefficient magnitudes at the second threshold to a first value, increase forward transform coefficient magnitudes above the second threshold to respective values, and to modify forward transform coefficient magnitudes between the first and second thresholds in accordance with a mapping function that increases monotonically with increasing forward transform coefficient magnitude from zero at the first threshold to the first value, and
   generating an output image from the filtered forward transform.

7. The machine of claim 6, wherein the bi-selective filter is configured to add a sharpening constant to forward transform coefficient magnitudes above the second threshold.

8. The machine of claim 7, wherein the mapping function increases linearly from zero to the sum of the values of the second threshold and the sharpening constant.

9. The machine of claim 6, wherein the at least one data processing module computes an inverse transform from the filtered forward transform.

10. A non-transitory machine-readable medium storing machine-readable instructions for causing a machine to:
    compute a forward transform of the input image;
    apply to the forward transform a bi-selective filter configured to smooth image regions with low magnitudes coefficients of the forward transform and to sharpen image regions with high magnitudes coefficients of the forward transform, wherein the bi-selective filter is configured to:
    set forward transform coefficient magnitudes below a first threshold to zero;
    add a sharpening constant to forward transform coefficient magnitudes above a second threshold; and
    modify forward transform coefficient magnitudes between the first and second thresholds in accordance with a mapping function that increases monotonically with increasing forward transform coefficient magnitude from zero at the first threshold to the sum of the values of the second threshold and the sharpening constant at the second threshold; and
    generate an output image from the filtered forward transform.

11. The non-transitory machine-readable medium of claim 10, wherein the mapping function increases linearly from zero to the sum of the values of the second threshold and the sharpening constant.

12. The machine-readable medium of claim 10, wherein the machine-readable instructions cause the machine to compute an inverse transform from the filtered forward transform.

13. A machine-implemented method of processing an input image, comprising:
    computing a forward transform of the input image;
    applying to the forward transform a bi-selective filter configured to smooth image regions with low magnitude coefficients of the forward transform and to sharpen image regions with high magnitude coefficients of the forward transform, wherein the bi-selective filter $\phi(c)$ operates on the magnitudes of the forward transform coefficients (c) in accordance with:

$\phi(c) = 0$, for $0 \leq c \leq \lambda_1$ $= \alpha \cdot (c - \lambda_1)$, for $\lambda_1 \leq c \leq \lambda_2$ $= c + \beta$, for $c \geq \lambda_2$ where $\alpha$ is a slope parameter of a mapping function and $\alpha > 1$, $\lambda_1$ and $\lambda_2$ are first and second threshold parameters with $\lambda_1 < \lambda_2$, and $\beta$ is a sharpening parameter; and
    generating an output image from the filtered forward transform.

14. The method of claim 13, wherein at least one of the parameters $\alpha$, $\lambda_1$, $\lambda_2$, and $\beta$ is a variable that has different values in the applying.

15. The method of claim 14, wherein at least one of the parameters $\alpha$, $\lambda_1$, $\lambda_2$, and $\beta$ has values that vary depending on local texture measurements of one or more regions of the input image.

16. The method of claim 14, wherein at least one of the parameters $\alpha$, $\lambda_1$, $\lambda_2$, and $\beta$ has values that vary depending on image content analysis of one or more regions of the input image.

* * * * *